Oct. 31, 1967 P. E. GLASER 3,349,574
INFLATABLE FLEXIBLE DOUBLE-WALL INSULATING SEALED
CONTAINERS FOR TRANSPORTING PERISHABLES
IN A CONTROLLED ATMOSPHERE
Filed July 31, 1964 2 Sheets-Sheet 1

INVENTOR.
Peter E. Glaser
BY
Agent

Oct. 31, 1967   P. E. GLASER   3,349,574
INFLATABLE FLEXIBLE DOUBLE-WALL INSULATING SEALED
CONTAINERS FOR TRANSPORTING PERISHABLES
IN A CONTROLLED ATMOSPHERE
Filed July 31, 1964   2 Sheets-Sheet 2

INVENTOR.
Peter E. Glaser
BY
Agent

United States Patent Office 3,349,574
Patented Oct. 31, 1967

3,349,574
INFLATABLE FLEXIBLE DOUBLE-WALL INSULATING SEALED CONTAINERS FOR TRANSPORTING PERISHABLES IN A CONTROLLED ATMOSPHERE
Peter E. Glaser, Lexington, Mass., assignor to Arthur D. Little, Inc., Cambridge, Mass., a corporation of Massachusetts
Filed July 31, 1964, Ser. No. 386,567
12 Claims. (Cl. 62—239)

The invention relates to inflatable flexible double-wall sealed containers for use in transporting and maintaining perishable goods under controlled conditions of temperature and humidity.

The transportation of perishables in insulated, refrigerated trucks, trailers or other vehicles has been widely used for about thirity years. Recent innovations in controlled atmosphere preservation of perishables appear to have promising application to long distance shipment. In conventional trucks or trailers, air-in-leakage amounts to about 25% of the heat load to the refrigerating system during the time the truck is in motion. The air in-leakage is not only undesirable because additional refrigeration capacity has to be provided but has obvious additional detrimental effects in the transport of perishables in trucks with controlled atmosphere generators. Therefore, it is essential that the container for the perishables be gas-tight so as to eliminate air leakage into the container.

There are two approaches for achieving this objective: provide a rigid insulating container with all edges tightly sealed and with a gas-tight barrier placed over the insulation; or inflate a flexible double-wall structure with an insulating gas to form a container to fit the inside dimensions of the truck, trailer or other transporting vehicle.

The flexible container has several advantages over the rigid container: (1) it can perform the double function of an insulation and a gas-tight container for the gaseous medium within; (2) it provides greater flexibility because the structure can be deflated, rolled or folded up and stored in a small package in the vehicle; (3) it can thus carry a wide variety of loads; and (4) it can be produced at a cost lower than that for a rigid container of comparable capacity.

It is, therefore, a principal object of this invention to provide a flexible, double-wall container having the foregoing advantages.

The container of this invention will now be described in a preferred embodiment in connection with the accompanying drawings, which are illustrative rather than limiting, and in which.

Figure 1:
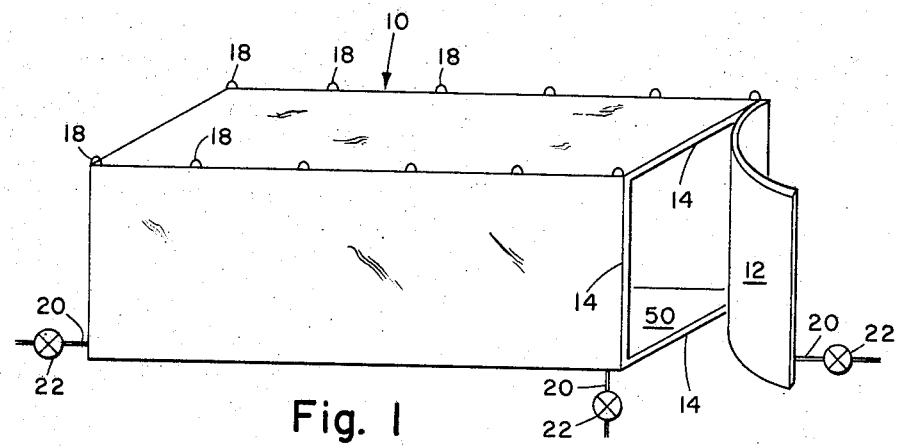
FIG. 1 is a general view of a typical container, with the end open.

An outside view of a typical form of the container of this invention is shown in FIG. 1, wherein the container is represented by the numeral 10. At one end is an opening for loading, which conveniently takes the form of a flap 12, and which can be closed in gas-tight sealing engagement with the edges 14 by known means, e.g. by a suitable zipper arrangement such as disclosed in Sperry et al. U.S. Patents 2,978,770 and 3,026,589, or by a magnetic closure around the edges of flap 12, thus sealing the container 10. At suitable locations around the top of the container are loops or other engaging means 18, which may be used for lifting the container 10 into position within the vehicle, as explained hereinafter. The flap 12 is a double wall flexible inflatable element of the same structure as the other walls of container 10. Lines 20 controlled by valves 22 are provided for inflating and deflating the container, as will be explained in more detail below.

The walls of container 10 are made of two sheets of gas-impermeable plastic which are assembled to form a self-supporting structure strong enough to withstand the necessary internal gas pressure, which may be from a few up to say 20 p.s.i.g., or even higher, depending upon requirements of the system. The term "walls" means top, bottom, side and end walls of the container 10, including flap 12 or other loading opening as indicated above. Typical wall materials include reinforced polyethylene and vinyl-coated or neoprene-coated nylon fabrics. The material selected should of course be such as to impart no undesirable odors to the loads to be carried, or to have any deleterious chemical or physical effects on the loads. To keep the two sheets of each wall at a desired separation distance, adhesively bonded ribs, drop-stitch weaving, or any other appropriate means can be used, as illustrated in more detail below. The resulting double wall exhibits structural properties after it is inflated to a sufficient internal pressure. It is not designed to be load-carrying (i.e. to carry any significant load other than that of itself), but is capable of attaining a desired geometrical shape to form the container. The gas for inflating the double wall also supplies insulation between the outside and the contents of container 10.

Suitable lines 20 controlled by valves 22 here shown schematically, are provided for inflating and deflating the walls of container 10 including flap 12. The number and locations of these lines depend upon the size of the container and the total volume of the space 30 between the double walls, and the rapidity with which it is desired to inflate or empty the space.

Figures 2, 3:
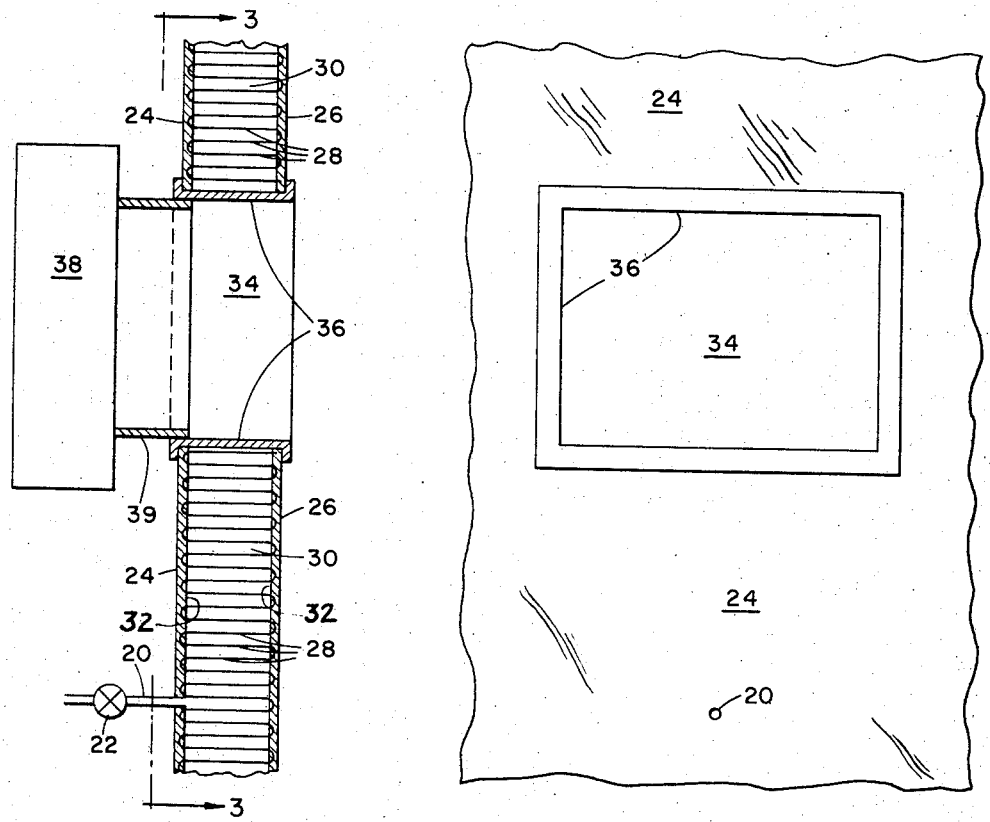
FIG. 2 is a section through a wall showing one arrangement for keeping the double walls at a desired distance apart.
FIG. 3 is a view of the outside of the wall of FIG. 2, looking in the direction of arrows 3—3.

In the arrangement shown in FIGS. 2 and 3, the double-wall structure is shown as consisting of an outer sheet 24, and an inner sheet 26, with stitching 28 which maintains the two sheets at a desired distance apart, enclosing the space 30 between the sheets of the double walls. Line 20 controlled by valve 22 is shown schematically communicating with space 30.

The gas used for inflating the walls of container 10 is preferably the same as that which surrounds the load within container 10. In the event of leaks in inner wall 26, the gas in spaces 30, being under slight pressure, will diffuse into the space around the load, without contaminating the gas in the latter space. Carbon dioxide is generally most convenient and readily available for both gases, but other low conductivity gases may be used such as various chlorinated fluorinated hydrocarbons available under the trade names Freon and Genetron.

An opening in one of the walls is provided for introducing gaseous fluid into the space within container 10. This gaseous fluid provides controlled conditions of temperature and gas composition within the container. The aforesaid opening, indicated by the numeral 34 (FIGS. 2 and 3) is ordinarily in the end wall opposite the wall having flap 12. This opening 34 is defined by a frame 36 which is bonded gas-tight to sheets 24 and 26 to prevent leakage from space 30. The aforesaid refrigeration may be provided by supply means 38 which discharges into opening 34 through duct 39.

Frame 36 need not be rigid and in fact may be made of plastic sheet into which the duct from the refrigeration apparatus leads and fits tightly and which is flexible enough to fold up with the container as an integral part of it.

The insulating effectiveness of the double-wall container is dependent upon the low conductivity of the gas in space 30, the absence of convection currents, and the reflectivity of the walls. Because the insulating effectiveness is achieved by a gas transparent to radiation, the radiant heat transfer through the double-wall structure should be controlled. Reduction of this heat transfer is conveniently accomplished by using a suitable radiation shield, e.g. by bonding thin aluminum foil to the interior face of inner sheet 26 or by vacuum-depositing reflecting layers of aluminum thereon or by coating that face with a reflecting paint. This radiation shield is shown as layers 32 in FIGS. 4 and 6. In FIG. 2 it constitutes a very thin coating on both of the interior faces 32 of sheets 24 and 26.

Natural convection currents can be minimized by a drop-stitch assembly arrangement as indicated by the numeral 28 in FIG. 2. This stitching is attached or bonded to walls 24 and 26 by known means, and maintains these walls substantially parallel to each other when the container is inflated. The stitching can be arranged with raveled threads to reduce natural convection, but is loose enough so that gas can be made to pass throughout the double-wall structure practically unimpeded.

Figure 4:
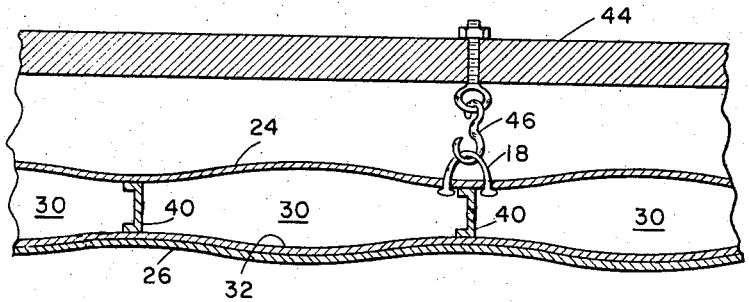
FIG. 4 is a wall section showing another such arrangement and also means for attachment of hooks or other holding devices to the container, specifically along the top edge.

The adhesively bonded rib structure already referred to is shown at 40 in FIG. 4. These ribs 40 are fastened to outer sheet 24 and inner sheet 26 by suitable means, e.g. an adhesive. In order to allow circulation between the spaces 30, the ribs are preferably arranged to terminate short of the edges of sheets 24 and 26, thus providing a kind of "header" arrangement through which the inflating gas from lines 20 can flow.

This adhesively bonded rib structure, if used, is preferably arranged horizontally in the vertical walls of container 10, and so arranged it serves to minimize natural convection currents.

In order to facilitate installation of the inflated container 10 in the carrying vehicle, it may be raised into position by grappling the loops 18. These are preferably built into the upper edges of the container and adjacent to some of the ribs 40 to provide sufficient strength without rupturing the outer sheet 24. An element 44 of the vehicle structure may be provided with grappling means such as hooks 46 which are adapted to engage loops 18. Although the container is self-supporting when the walls are inflated, the use of the described grappling means is nevertheless helpful in reducing sideways and other motion during transport, especially over rough terrain or in irregular driving patterns.

Figure 5:
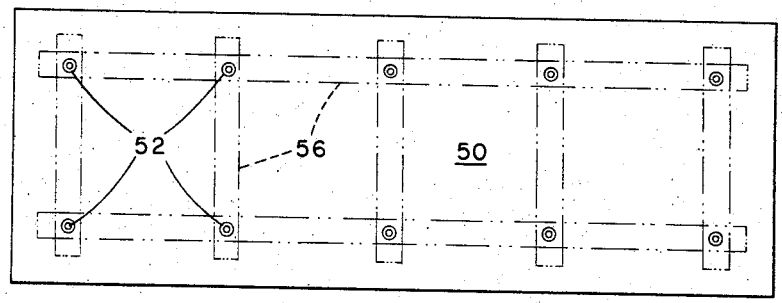
FIG. 5 is a plan view of the bottom of the container showing locations of elements for support of loads.
Figure 6:
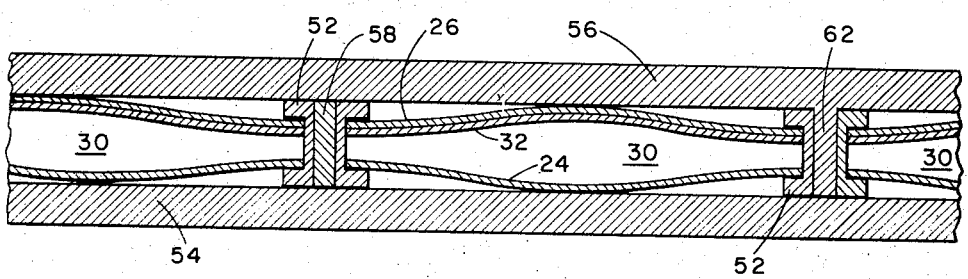
FIG. 6 is a section through a portion of the bottom wall of the container showing details of two of the aforesaid elements.

Most, if not all, loads are so heavy, irregular and/or rigid that they would damage the bottom wall of container 10 if placed directly upon it. An arrangement for protecting the bottom wall is shown in FIGS. 5 and 6. The bottom wall represented by the numeral 50 (similarly in FIG. 1) is provided with heavy eyelets or similar rigid load-supporting elements 52 extending completely through the double wall and arranged to contact the floor 54 of the vehicle. The opposite (upper) ends of elements 52 are arranged to support a frame or other load-bearing structure 56 (shown in dotted lines in FIG. 5). The vehicle is then loaded by placing the load on top of structure 56 within inflated container 10. Elements 52 may be solid, or hollow and filled with insulation 58. Alternatively, structure 56 may be provided with attached legs which fit into the hollows of elements 52, and which thus may serve to position bottom wall 50 and even to help support structure 56 in addition to the support provided by elements 52. Inflatable dunnage may also be used as a protective medium for the bottom wall 50.

Inflation of the double walls of the container 10 may be accomplished by the gas from compressed gas cylinders carried by the vehicle. A standard 220 cubic foot pressurized gas cylinder is adequate to inflate the container in a standard 8' x 8' x 20' truck body, using for example carbon dioxide or Freon as the low-conductivity gas and with the double walls spaced approximately 1 to 2 inches apart, and an internal pressure of about 2 to 5 p.s.i.g. Inflation is carried out through lines 20 as already pointed out.

Removal of the container 10 from the vehicle may be accomplished in the reverse order of installation. To accelerate deflation of the container, quick-connect couplings may be connected to lines 20 and valved to the manifold of the vehicle engine (assuming it to be an internal combustion engine) to assist in drawing down the inflated walls. The exact placement of lines 20 depends upon selection of the method of rolling up or folding the deflated container 10.

Refrigeration and/or controlled atmosphere is introduced from source 38 through opening 34 after the container 10 is inflated and in place, and the load is introduced at appropriate time, preferably after the interior has been cooled. When the system is cooled down and in operation, and assuming a refrigeration unit of capacity ordinarily considered appropriate for a vehicle of the size in question, a temperature of about 35° F. can be readily maintained within container 10 when the outside temperature is about 150° F., using double-wall thickness of 1 to 2 inches and $CO_2$ as the inflating gas.

I claim:

1. Methods of transporting perishable goods in the body of a vehicle, and comprising the steps of;
    forming a double-walled, sealable container from sheets of substantially gas-impermeable, flexible material;
    positioning said container within said body;
    inflating the interspace between the walls of said container with a gas having a lower thermal conductivity than air, and to a pressure sufficient to render said container self-supporting;
    loading said goods into the interior of said container;
    filling the space within said container around said goods with a gas cooled to predetermined refrigerating temperature, said gas having a lower thermal conductivity than air and being relatively chemically non-reactive with said goods; and
    sealing said space from external communication with ambient air.

2. Method of transporting perishable goods in the body of a vehicle, and comprising the steps of:
    forming a double-walled, sealable container from sheets of substantially gas-impermeable, flexible material;
    positioning said container within said body;
    inflating the interspace between the walls of said container with a gas having a lower thermal conductivity than air and being relatively chemically non-reactive with said goods, and to a pressure sufficient to render said container self-supporting;
    filling said space with said goods and more of said gas cooled to a predetermined refrigerating temperature; and
    sealing said space from external communication with ambient air.

3. Method as defined in claim 2 wherein said gas is carbon dioxide.

4. Method as defined in claim 2 wherein said gas is a halogenated hydrocarbon.

5. Method as defined in claim 2 including the step of adding heat-reflective layer to said double-walls.

6. Method as defined in claim 2 including the step of baffling said interspace to reduce convection within said double-wall.

7. Method as defined in claim 2 including the steps of releasably locking said container to said body.

8. An inflatable flexible container comprising:
a flexible outer bag of substantially gas-impervious material;
a flexible inner bag of substantially gas impervious material, wholly enclosed within said outer bag and being spaced from the latter, and sealed along its free edges to the free edges of said outer bag to form a hollow wall container;
a gas disposed between said bags at superatmospheric pressure so as to form a layer substantially surrounding the space defined within said hollow wall, said gas having a lower thermal conductivity than air; and
sealable means providing access through both bags for permitting loading and unloading of the interior of said container.

9. A container as defined in claim 8, further comprising a gas atmosphere within the interior of said inner bag, said atmosphere being substantially chemically inert and having a lower thermal conductivity than air.

10. A container as defined in claim 9, further characterized in that said gas disposed between said bags and said atmosphere are of the same composition.

11. A container as defined in claim 8, wherein said sealable means comprises means defining an opening through adjacent portions of said bags, cover means normally disposed across said opening and movable for covering and uncovering said opening, and means for releasably sealing said cover means to the periphery of said opening in a gas-tight relation.

12. An inflatable flexible container as defined in claim 8 wherein at least one of said bags includes a radiation reflective barrier disposed between said bags.

References Cited

UNITED STATES PATENTS

| | | | |
|---|---|---|---|
| 2,162,271 | 6/1939 | Munters | 220—9 |
| 2,513,749 | 7/1950 | Schilling | 220—9 |
| 2,569,217 | 9/1951 | Bagdigian | 99—189 |
| 2,702,458 | 2/1955 | Del Mar | 220—9 |
| 2,913,029 | 11/1959 | Paton | 150—1 |
| 2,951,608 | 9/1960 | Morrison | 220—9 |

JOSEPH R. LECLAIR, *Primary Examiner.*

GEORGE O. RALSTON, *Examiner.*

R. PESHOCK, *Assistant Examiner.*